US012607492B2

(12) United States Patent
Martinez Gimeno

(10) Patent No.: US 12,607,492 B2
(45) Date of Patent: Apr. 21, 2026

(54) LIQUID DISPENSING DOSING DEVICE FOR A LIQUID RECEPTACLE

(71) Applicant: Carlos Vicente Martinez Gimeno, Alicante (ES)

(72) Inventor: Carlos Vicente Martinez Gimeno, Alicante (ES)

( * ) Notice: Subject to any disclaimer, the term of this patent is extended or adjusted under 35 U.S.C. 154(b) by 230 days.

(21) Appl. No.: 18/044,097

(22) PCT Filed: Sep. 9, 2020

(86) PCT No.: PCT/ES2020/070542

§ 371 (c)(1),
(2) Date: Mar. 6, 2023

(87) PCT Pub. No.: WO2022/053722

PCT Pub. Date: Mar. 17, 2022

(65) Prior Publication Data

US 2023/0324211 A1     Oct. 12, 2023

(51) Int. Cl.
    *G01F 11/26*         (2006.01)
    *G01F 11/00*         (2006.01)

(52) U.S. Cl.
    CPC .......... *G01F 11/263* (2013.01); *G01F 11/006* (2013.01)

(58) Field of Classification Search
    CPC ...... G01F 11/263; G01F 11/006; G01F 11/28; G01F 11/30; G01F 11/42; G01F 11/10
    See application file for complete search history.

(56) References Cited

U.S. PATENT DOCUMENTS

| | | | | |
|---|---|---|---|---|
| 4,579,256 A | * | 4/1986 | Heimlich | G01F 11/268 |
| | | | | 222/162 |
| 4,886,193 A | * | 12/1989 | Wassilieff | G01F 11/263 |
| | | | | 141/383 |
| 5,020,699 A | * | 6/1991 | Sams | G01F 11/263 |
| | | | | 222/443 |
| 6,131,774 A | * | 10/2000 | Thomas | G01F 11/34 |
| | | | | 222/440 |
| 9,085,397 B2 | * | 7/2015 | Maas | B65D 50/06 |
| 11,807,426 B2 | * | 11/2023 | Fengke | B65D 47/247 |

* cited by examiner

*Primary Examiner* — Vishal Pancholi
(74) *Attorney, Agent, or Firm* — Colin P. Abrahams

(57) ABSTRACT

The invention comprises a cylindrical reservoir (1) with a mouth (14), side through hole (3), shaft (28) and perimeter flange (8) whose top is associated with a concentric cover (2) anchored to the container (6) equipped with an upper mouth (13), vertical or diagonal grooves (16) and a lower mouth (11); the cover (2) enables the rotary or longitudinal sliding of the reservoir (1), which is activated by the pressure exerted by the cap (T) on said reservoir (1) which descends when the container is closed and takes the side through hole (3) out from inside the cover (2), descent that enables the reservoir (1) to be filled; when removing said cap (T), the reservoir (1) rises driven by the compression means (10), (17), (24) or (25) leaving the through hole (3) thereof enclosed inside the cover (2); the dose (Ds) is selected by tipping over the container (6) and when the liquid returns to the vertical position and is levelled, it is calibrated and when the cap is unscrewed, it is served and used, and so on.

6 Claims, 12 Drawing Sheets

Cross section A-B

LIQUID DISPENSING DOSING DEVICE FOR A LIQUID RECEPTACLE

TECHNICAL FIELD

The present invention relates to a liquid dosing device that is inserted into the neck of the containers or bottles that adopt it after they are industrially filled.

BACKGROUND OF THE INVENTION

Millions of containers for liquids are consumed daily around the world which, due to their characteristics, require that they be consumed in controlled portions; the need for them and their marketing and scope reach all social areas. Detergents, fabric softeners, liquid soaps, medicinal syrups, chemical products and toxic insecticides and abrasive products can be mentioned. All of them must be used in doses and the very cap of the container is currently used to measure them. For more than one hundred years, many inventors have tried to simplify this common operation. Currently known are patents for dosing bottles and containers from 1896 to the present, which were not manufactured because the technology of the time could not solve important production problems, such as the difficulty of chain filling, among others, since the existence of a smaller chamber between the outlet and the main reservoir made it difficult for liquids to enter and made industrial filling impossible. Patent archetypes that aimed to improve this operation are documents US595176, U.S. Pat. Nos. 2,204,104, 4,079,859, 4,646,948, 4,860,927, 4,893,732, WO03/089319, NL1035069, WO2014/012212, JP62821 and EP0436260 A1.

Today, in the 21st century, consumers need receptacles that incorporate an economical, hygienic, fast and precise dosing system that simplifies the obtaining of doses and does not increase the final price of the product; otherwise, the industrial application thereof would be impossible in an extremely competitive sector.

DESCRIPTION OF THE INVENTION

To overcome the drawbacks of the state of the art, a first aspect of the present invention proposes a liquid dispensing dosing device for a liquid receptacle with a dispensing neck that can be closed with a cap, the dosing device comprising:

coupling means for coupling the dosing device to a neck of a liquid receptacle. In some embodiments, the coupling means comprise a protrusion or perimeter flange for resting on the edge of a neck of a receptacle or on a step fastened to the inside of a neck of a receptacle. In some of these embodiments and in other embodiments, the coupling means comprise a thread complementary to a thread of a bottle neck. In some of these embodiments and other embodiments, alternative coupling means may be used, such as an adhesive, weld, bolt, or other type of mechanical joint.

a liquid reservoir comprising a liquid inlet hole, the hole being arranged to be inserted into a receptacle when the dosing device is coupled by means of coupling means. Therefore, the location of the hole is such that after coupling the dosing device to a receptacle, the hole is inserted into the receptacle so that it can be submerged in liquid contained in the receptacle, thus filling the reservoir. Although the term "reservoir" has been mainly used in this specification, the term "cylinder" could also have been used.

a cover for the hole, the cover and the reservoir being slidably connected. This sliding enables a user to selectively cover and uncover the hole. Although the term "cover" has been mainly used in this specification, the term "bushing" could also have been used.

the dosing device having:

a first configuration wherein the cover covers the liquid inlet hole of the reservoir, preventing liquid from passing through the hole, a second configuration wherein the cover does not cover the liquid inlet hole, allowing liquid to enter the reservoir through the hole;

the dosing device further comprising:

coupling means for coupling to a cap of a receptacle configured to be pressed by a cap in the closure of the dispensing neck so as to cause sliding between reservoir and cover, going from the first configuration to the second configuration. Thus, a cap that is used to cap the neck has the additional feature of uncovering the hole of the reservoir. This can be achieved by means of a segment of the dosing device arranged therein so that after coupling the dosing device to a neck by means of the coupling means, the segment is interposed in the movement that the cap must perform to close the neck. Since this segment is connected to the reservoir or the cover, the plugging itself causes sliding between the cover and the reservoir. Although in preferred embodiments of the invention this segment comes in contact with the cap, other embodiments wherein the cap does not need to come in contact with the segment are not excluded, for example because the cap and the segment are magnetised with polarities that generate repulsion between them.

return means for returning from the second configuration to the first configuration and configured to cause sliding between reservoir and cover, going from the second configuration to the first configuration by releasing the pressure exerted by the cap on the coupling means for coupling to a cap at the opening of the dispensing neck. This sliding can be caused by the return means since plugging causes a state of high tension therein balanced with the pressure exerted by the cap on the coupling means for coupling to the cap. By unplugging the neck, the pressure of the cap on the coupling means for coupling to the cap disappears, such that the tension of the return means is released, causing sliding between the reservoir and the cover.

In some embodiments of the dosing device, the reservoir comprises a top, a bottom and a side wall that joins the bottom to the top, wherein the top is open to the outside, the side wall comprises the liquid inlet hole and the bottom comprises a wall that extends to the side wall, preventing liquid from entering below the hole. While the specific embodiments described in the present specification show that the hole is located in the side wall, in other embodiments that are not shown the liquid inlet hole in the reservoir is located at the bottom of the reservoir.

In some embodiments of the dosing device, the reservoir comprises a protrusion configured to come in contact in a leak-tight manner with the cover in the first configuration. Although the specific embodiments described in this specification show that the protrusion or perimeter flange is part of the reservoir, in some embodiments of the dosing device the cover comprises a face oriented towards the hole of the reservoir and said face has the protrusion or perimeter flange configured to come in contact in a leak-tight manner with the reservoir in the first configuration.

In some embodiments of the dosing device, the coupling means for coupling to a neck comprise a bushing with a perimeter protrusion. The bushing facilitates the coupling of the dosing device to a bottle neck without considerably increasing the number of parts that make up the dosing device or the complexity of the dosing device mechanisms. By merely resting the perimeter protrusion of the bushing on a protrusion of a bottle neck, the coupling between dosing device and bottle neck can be achieved.

In some embodiments of the dosing device, the cover is part of the bushing. Thus, the dosing device is very simple, since with one piece, the bushing, the dosing device is provided with coupling means for coupling to a bottle neck and a cover for the liquid inlet hole of the dosing device.

In some embodiments of the dosing device, the cover comprises a channel or a protrusion and the reservoir comprises, respectively, a complementary protrusion inserted into the channel of the cover or a complementary channel into which the protrusion of the cover is inserted. Thus, a guide for the relative sliding between reservoir and cover is achieved. In some of these embodiments, the channel (of the cover and/or of the reservoir) extends in the longitudinal direction of the cover. Thus, the reservoir, in the sliding movement thereof with respect to the cover, enters and exits the cover.

In some embodiments of the dosing device, the reservoir is fastened to a shaft inside the reservoir and the shaft is joined to the cover by the return means. Thus, by pressing the shaft, either by means of a cap or by the return means, it is possible to slide the reservoir with respect to the cover. In other embodiments, the shaft is fastened to the cover and joined to the reservoir by the return means.

A second aspect of the present invention proposes a liquid dispensing dosing device for a liquid receptacle with a dispensing neck that can be closed with a cap, the dosing device comprising:

a liquid reservoir comprising a top, a bottom and a side wall that joins the bottom to the top, wherein the top is open, the side wall comprises a hole and the bottom comprises a wall that extends to the side wall, preventing liquid from entering below the hole;

sliding coupling means for coupling the reservoir to a neck of a liquid receptacle, wherein the coupling means enable the reservoir to slide in the longitudinal direction of the neck, said sliding which may also be rotary.

wherein the reservoir comprises a protrusion arranged between the bottom of the reservoir and the bottom of the hole in the side wall;

wherein the dimensions of the protrusion are suited to come in contact with the neck in such a way as to prevent liquid from passing towards the hole in the side wall. Thus, by sliding the reservoir inside the neck, the position of the protrusion inside the neck can be adjusted and therefore the inlet of liquid into the reservoir through the hole in the side wall can be controlled.

the dosing device further comprising:

coupling means for coupling to a cap configured to be pressed by a cap when plugging the dispensing neck, causing the reservoir to slide in the longitudinal direction of the neck and in the direction that goes from the top to the bottom of the reservoir, which at the same time can slide by rotating;

return means configured to cause the reservoir to slide in the longitudinal direction of the neck and in the direction that goes from the bottom to the top of the reservoir, when releasing the pressure exerted by the cap on the coupling means when unplugging the dispensing neck.

This second aspect of the invention, compared to the first aspect of the invention, is simpler since it does not require the dosing device to be provided with a cover for the liquid inlet hole of the reservoir; it is the very wall of the bottle neck, together with the protrusion of the reservoir, which performs the function of preventing fluid from accessing the fluid inlet hole of the side wall of the reservoir.

In some embodiments of the dosing device, the coupling means for coupling to a cap comprise a portion configured to come in contact with a cap.

In some embodiments of the dosing device, the coupling means for coupling the dosing device to a neck of a receptacle are removable coupling means. Thus, the dosing device can be coupled to a receptacle, used in said receptacle and subsequently pulled out of said receptacle, either to facilitate the filling of the receptacle or to use the same dosing device in a different receptacle.

In some embodiments of the dosing device, the liquid reservoir is transparent. Thus, the liquid contained in the reservoir can be visually inspected before it is poured. In some of these embodiments, the reservoir has volume calibration marks. Thus, the amount of liquid contained in the reservoir and therefore the dosage can be precisely controlled. In some of these embodiments, the reservoir is a cylinder.

In some embodiments of the dosing device according to the first aspect of the invention, the return means are elastic and mechanically connect the reservoir to the cover. Thus, the return force is achieved by pressing the elastic means with a cap, so that when the cap is removed, the pressure of the elastic means is released, and these elastic means force the cover to cover in a leak-tight manner the liquid inlet hole of the reservoir.

In some embodiments of the dosing device according to the second aspect of the invention, the return means are elastic and have one end resting on the reservoir and another end for resting on a neck of a receptacle. Thus, the return force is achieved by pressing the elastic means with a cap, so that when the cap is removed, the pressure of the elastic means is released, and these elastic means force the reservoir to rise in the insertion direction in the neck, such that the protrusion of the reservoir comes in contact with the neck forming a joint that is leak-tight to the liquid contained in the receptacle.

In some embodiments of the dosing device, the elastic return means comprise at least one means of a spring, an elastic ring, a semi-perimeter curtain or perimeter mesh made of elastic material, an elastic segment radial to the reservoir and a leaf spring. In the context of the present specification and unless otherwise indicated, leaf spring is understood as elastically tiltable shafts that are fastened to one of the reservoir or cover and are coupled with the ability to move to the other of the reservoir or cover such that they produce a joining force between the reservoir and the cover.

In some embodiments of the dosing device, the reservoir comprises a channel or a protrusion extending outside the bottom of the reservoir for coupling and guiding between the return means and the reservoir. Thus, the return means can be easily coupled to the reservoir. For example, if the return means comprise an elastic ring, the ends of this ring can be fastened to lugs of, for example, a cover and the intermediate part of the ring can be inserted into a channel at the bottom of the reservoir. Thus, by moving the bottom of the reservoir away from the lugs, the ring can be tightened.

In some embodiments, the dosing device comprises a shaft inside the reservoir and the shaft is a guide shaft of an adjustment system for adjusting the maximum storage volume of the reservoir. The shaft enables the height of the bottom of the reservoir to be adjusted in such a way that it allows the maximum depth of the reservoir to be adjusted and therefore the maximum liquid volume that it can contain.

In some embodiments, the dosing device further comprises a half-round extension to dispense liquid contained in the reservoir. This half-round makes it easier to pour liquid with greater precision.

Stated in a more detailed way, the present invention proposes a dosing cylinder for packaged liquids, which comprises a unique cylindrical reservoir intended to be concentrically associated with a cylindrical cover that enables the longitudinal and rotary sliding or not of said reservoir; an association that establishes a simple and efficient dosing system that is inserted and fastened inside the neck of containers and bottles after they are filled in order to safely, strictly and hygienically select and serve a perfectly calibrated dose. The main advantages of this invention are summarised as follows:

It adapts to all types of containers for liquids that are made of both plastic and glass.

The dose is selected with slight rotation of the assembly.

This device generates a dosing system that releases a predetermined portion of liquid that is retained and secured inside the reservoir until it is poured.

It prevents current dosing drawbacks resulting from pulse filling the cap.

If the receptacle falls or tips over, without being plugged, it prevents spills that stain or splash the floor with the consequent loss of liquid.

The system applied to bottles of alcoholic beverages selects the same amount every time, being able to control the number of times the liquid product is served and therefore report on the commercial performance of each bottle.

Since the dose is selected inside the container, the hygiene thereof is guaranteed.

Very useful and hygienic dose change devices can be added to this system when used to serve medicinal syrups for children and adults.

The dosing system proposed by this invention is invisible inside the neck of the container; therefore, it does not have an influence on the design of the container or its brand.

After selecting the dose by tilting or rotating the container, the cap is unscrewed to serve it, an action that discharges the potential energy of the compression means by driving the reservoir upwards, leaving the side through hole for filling inside the cover and therefore closed. Next, the cap is screwed on, which forces the side through hole of the reservoir to descend and return to the filling position thereof.

The liquid dispensing dosing device object of the invention adapts to all types of containers by using the internal structure thereof as an advantageous element that is involved in the operation of the system of the invention, specifically the intersection where the lower diameter of the container neck changes in size and where the shoulder of the same begins. This invention uses it to establish the inlet and outlet of the side through hole of the reservoir as the only opening that enables it to be filled with the liquid contained in the container.

In a preferred embodiment, the invention manufactured in one piece is described.

The dosing cylinder for packaged liquids, object of the invention, comprises a unique reservoir and a cylindrical cover, insertion means therebetween and anchoring means to the receiving receptacle and compression means; a common threaded cap or a cap with a central or cylindrical inner extension. These elements are detailed below:

THE RESERVOIR, it is made up of a closed cylinder that is leak-tight at the base thereof, whose upper third, approximately, is inserted concentrically inside the cover; said reservoir is unique because it has distinct features that contribute to the efficient operation of the dosing system. The diameter thereof is similar to that of the inside of the cover and the length thereof is determined by the size of the dose to be established.

In all preferred embodiments, the reservoir contains a through hole in a side proximal to the mouth which facilitates the filling thereof. This filling occurs when the container is closed with a cap having an extension provided therein which pushes the reservoir and makes it descend so that the side through hole exits the cover and remains in the cavity of the container; the only position that enables filling and selection of the dose.

In all preferred embodiments, a frustoconical perimeter flange is located below said side through hole which, with the container unplugged, hermetically closes the passage of the liquid from the container to the reservoir, cover and outlet mouth. In a preferred embodiment, the fastening means for fastening the reservoir to the cover occurs by means of pins that the cover contains proximal to the mouth thereof.

In another preferred embodiment of the dosing cylinder, the insertion means is configured by a longitudinal concentric shaft that originates in the inner base of the reservoir and has anchoring tabs at the upper distal end thereof.

THE COVER, it is cylindrical with two mouths that adapts and is fastened inside the neck of the containers or bottles; therefore, the diameter and length thereof are similar to those inside the neck of the same. The insertion and solid fastening thereof to the receptacle allows the associated concentric reservoir to slide. The upper mouth thereof has a perimeter flange that sits on the lip of the mouth of the receptacle or on a perimeter step provided inside the neck of the receiving container.

In another preferred embodiment, the cover contains a smaller concentric cylinder joined to it by means of radial segments and a through hole to receive the anchoring tabs of the upper distal end of the reservoir shaft.

In another one of its preferred embodiments, the cover contains two longitudinal or diagonal through grooves that receive, guide and limit the sliding and travel of the reservoir pins.

In another preferred embodiment wherein the cover is made of an elastomeric polymer, it contains in the upper mouth thereof a smaller concentric cylinder supported by at least two spokes that, due to the geometry and material thereof, act as compression means, capable of storing and releasing potential energy to keep the elements that close in a leak-tight manner the circulation of the inner liquid in direct contact, which are: the lower mouth of the cover and the frustoconical perimeter flange of the reservoir.

In another preferred embodiment, the cover contains in the upper mouth thereof at least two spokes that converge in a small concentric cylinder with a through hole and an inner perimeter step on which a compression spring sits, the actuation stop of which is located in the anchoring tabs provided at the upper distal end of the central shaft of the reservoir so that this reservoir slides and rises when the container is not plugged.

In another preferred embodiment, the cover contains at least two nascent longitudinal segments in the lower mouth thereof, the geometry and material thereof allow them to function as leaf springs and, in another embodiment, as a support bracket for the compression means.

In another preferred embodiment, the cover contains in the upper mouth thereof a partial enclosure as a conduit that reduces the stream of liquid as it is poured.

In another preferred embodiment, the cover is manufactured joined by the outer area of the upper mouth thereof to another larger outer and concentric cylinder, which is used as other insertion means to the container, in this case by screwing, since said associated peripheral cylinder has both vertical threaded faces, which enables it to be fastened to the receptacle by the internal thread thereof and the screwing of the cap from the outside.

In another preferred embodiment, the smaller concentric cylinder contains a compression spring that, with the unplugged receptacle, pushes the shaft of the reservoir so that the perimeter flange thereof comes in contact with the lower mouth of the cover and closes the liquid transit.

In all preferred embodiments, this invention uses the perimeter intersection existing between the neck and shoulder of the receiving container as a direct participant in the operation of the dosing system.

In another preferred embodiment, the dosing cylinder has a half-round partial elongation of the perimeter of the mouth thereof which facilitates and channels the pour; when removing the cap of the container, said elongation driven by the compression means protrudes from the neck and the pressure exerted when screwing on a common cap pushes it towards the inside of the neck, translation that slides the reservoir to the filling position since the side through hole thereof, when lowered, exits the cover, the only location that enables the dose to be selected with the liquid of the container.

In another preferred embodiment, the reservoir contains at the base thereof a transverse slot wherein the rubber rings that act as compression means are seated.

In another preferred embodiment of the dosing cylinder, the reservoir is equipped with a central shaft, which receives a clamp containing a piston that can be manoeuvred in both directions and is handled by means of a control lever or segment that raises or lowers the base of the reservoir to reduce or increase the size of the dose to be consumed.

In another preferred embodiment, the dispensing dosing device is made of elastic material, the base of the reservoir is configured in the shape of an ascending longitudinal inner cone whose vertex contains a threaded through hole to receive a rotating shaft whose lower distal end is configured as a worm screw to raise or lower the base of the reservoir which, with the change in volume, is able to vary the doses.

In another preferred embodiment, the system is rigged so that the reservoir driven by the central extension of the cap, with the lower distal end as a screwdriver, rotates and pulls the side through hole out of the cover to fill the reservoir.

In a preferred embodiment, the dosing reservoir is manufactured by simultaneous injection of different materials, one made of rigid plastic that configures the top of the cover and most of the reservoir and the other made of elastic material to form the compression or traction zone associated with both elements; this economic and hygienic dosing system is obtained to equip all types of containers and achieve an economic innovative solution for packaged liquids that can be dosed.

In another preferred embodiment, this system makes it possible to forego the cover if the container is manufactured with a minimum step, like a seat of a compression spring located on the inner perimeter of the neck, under the thread of the cap, and manufacturing the reservoir with two perimeter flanges, one made of elastic material which enables it to be inserted into the angular perimeter existing between the base of the container neck and the start of the shoulders thereof and the other flange made of rigid material located in the mouth of the reservoir as a counter-stop for the compression spring.

In another preferred embodiment, this system lowers the production costs and price of the product it contains when it is inserted into the container by screwing, since the end customer reuses the dosing device of the already used container by screwing it onto a new container acquired without the dosing cylinder. This contributes to notable savings of the product and the reduction of plastic waste.

In another preferred embodiment to enable the container to serve larger portions or all of its content, said container is provided with a special cap that contains at the top thereof an extension with a threaded lid that can be opened with the edge of a coin on the plugged container, in order to freely pour part or all of its content.

In another preferred embodiment, the dosing device object of the invention, while maintaining the operating principle, can swap the functions of the two main elements thereof: the reservoir is fastened to the neck of the container and the cover, inside the reservoir and driven by the compression means, rises and closes the circulation of the fluid and, when pressed by the cap, descends and opens the side through hole of the reservoir in order to fill it with the dose.

A third aspect of the invention relates to a liquid receptacle comprising a dosing device according to the first or second aspect of the invention coupled to a liquid dispensing neck of the receptacle.

A fourth aspect of the invention relates to a method for dispensing a dose of liquid from a receptacle with a neck comprising the steps of:

coupling a dosing device according to the first or second aspect of the invention to a fluid dispensing neck of a receptacle containing liquid;

plugging the neck with the coupled dosing device, uncovering a fluid inlet hole in the reservoir of the dosing device;

with the cap on, rotating the receptacle to a position for dispensing liquid from the receptacle by means of gravity and rotating the receptacle back to a position where liquid is not dispensed by means of gravity;

removing the cap from the receptacle, covering the fluid entry hole in the reservoir of the dosing device in a leak-tight manner;

with the cap removed, rotating the receptacle to a position for dispensing liquid from the receptacle by means of gravity.

In other words, the basic sequences of the method for using the dosing cylinder, object of the invention, comprise the following steps:

To select the dose in the cylinder, the container must be plugged since the cap, in addition to being a closing element, also acts as a drive means that pushes the reservoir and pulls the side through hole of the reservoir out of the cover, the only way to fill it with the inner liquid.

When tipping the closed container, the inner liquid floods the reservoir through the side through hole thereof, and when the container is returned to the vertical or resting position, the dose is calibrated by levelling as the remaining liquid returns to the interior by means of gravity.

The cap is unscrewed and the reservoir with the dose immediately rises inside the cover driven by the compression means and the side through hole is enclosed therein so that the selected dose is secured and is poured through the only possible outlet: The mouth of the container.

Once the dose has been extracted, the cap is screwed on, an action that pulls the side through hole of the reservoir out of the cover, the only position of this reservoir that enables the reservoir to be filled and the dose to be calibrated in order to serve it again.

BRIEF DESCRIPTION OF THE DRAWINGS

As a complement to the description provided herein, and for the purpose of helping to make the features of the invention more readily understandable, in accordance with several preferred practical exemplary embodiments thereof, said description is accompanied by several sets of figures constituting an integral part of the same, which by way of illustration and not limitation, represent the following.

PREFERRED EMBODIMENT OF THE INVENTION

Figure 1:
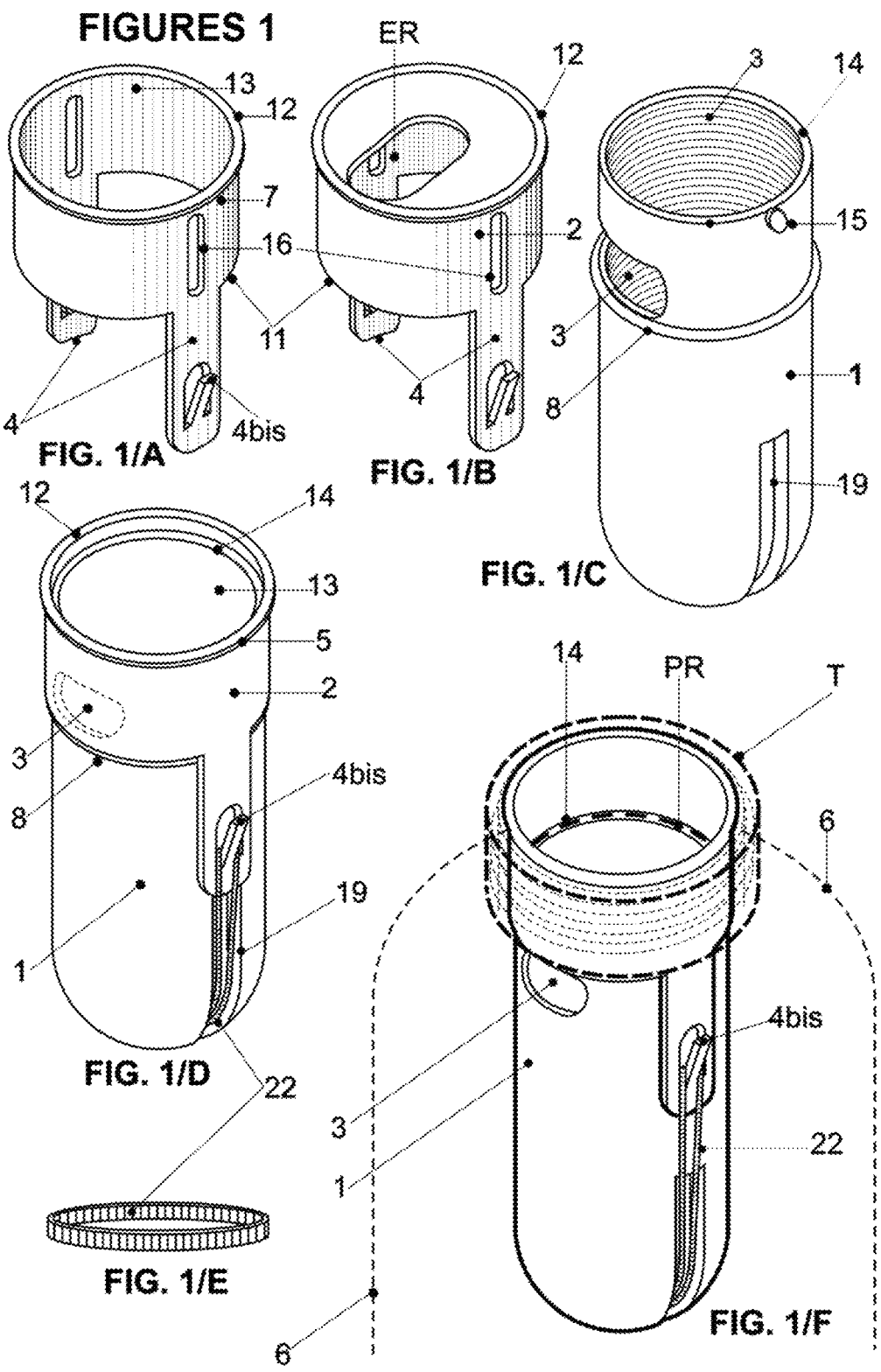
FIG. 1 describe in respective perspective views a possible embodiment of the dosing cylinder according to the present invention.

In light of the aforementioned figures, and in accordance with the adopted numbering, one may observe therein examples of preferred embodiments of the invention, which comprise the parts and elements indicated and described in detail below.

Thus, as can be seen in FIGS. 1 to 12, several possible preferred embodiments of the dosing cylinder for packaged liquids that in most of the preferred embodiments thereof is composed of the reservoir 1 and the cover 2 which are associated and inserted in the neck 5 of the containers 6 to serve calibrated doses Ds in a comfortable and hygienic way. It mainly comprises the following elements:

A cylindrical reservoir 1 that is hollow and leak-tight at the base thereof, with a mouth 14 whose diameter enables it to be inserted inside the cover 2; it contains a side through hole 3 and below this hole a frustoconical perimeter flange 8; in some preferred embodiments, there are pins 15 and a half-round extension 33 in the mouth 14 thereof.

a cylindrical cover 2 with two mouths, an upper mouth 13 and lower mouth 11, whose diameter, length and insertion means enable it to be anchored in a leak-tight manner inside the neck 5 of the receiving container 6 and it contains two facing vertical or diagonal grooves 16 and a perimeter flange 12 for seating and fastening to the container 6; in some preferred embodiments, it contains longitudinal extensions 4 or leaf springs 10 and an upper mouth 13; in other preferred embodiments thereof, it contains radial segments that converge in a smaller concentric cylinder 18 that acts as a receiver for anchoring means and/or as a receiver for a compression spring; said spokes made of an elastomeric polymer or elastic material works as compression means.

sealing means which in the preferred embodiments are: the lower mouth 11 of the cover 2 and the frustoconical perimeter flange 8 of the reservoir 1 located under the through hole 3 which, when the cap T is unscrewed, rises driven by the corresponding compression means and comes into firm contact with said mouth 11 in order to close the circulation of the liquid, compression means adopted by the invention and which, according to the preferred embodiment, can be: Longitudinal leaf springs 10 of the cover; compression springs 17, rubber rings 22; mesh, curtain or elastic vertical segments 24 and radial segments 25 of the cover 2 made of an elastomeric polymer. All of them act so that the cover 2 and the reservoir 1 remain in constant contact and closure until they are separated by the pressure exerted by the cap T when it is screwed on, with an extension PR provided in the cavity thereof or the pressure that is exerted when a common cap T is screwed on the half-round elongation 33 of the mouth 14 of the reservoir 1.

in another preferred embodiment, the fastening to the container is caused by screwing the cover and reservoir by means of a double-threaded peripheral cylinder, provided therein, an internal thread 9 to be screwed to the container and another external thread 30 to be screwed to the cap T.

The association of both elements, reservoir 1 and cover 2 fastened in a leak-tight manner to the container 6 enables the longitudinal or rotary sliding of said reservoir 1 and, therefore, that of the side through hole 3 thereof, fundamental translation of the invention, since said through hole 3, the only inlet for the liquid inside the container 6, adopts two positions with two very different functions:

With the container plugged, the reservoir 1 descends towards the cavity of the container 6 and the through hole thereof 3 goes down with it and exits the cover 2. In this new position, the reservoir 1 can be filled with liquid and the dose can be selected. However, with the container 6 without the cap T, the corresponding released compression means lifts the reservoir 1 and the through hole 3 thereof is hermetically enclosed inside the cover 2 since the perimeter flange 8 of the reservoir 1 comes in contact with the lower frustoconical mouth 11 of said cover 2 to prevent liquid from circulating.

The potential energy of the compression means in each preferred embodiment remains charged with the plugged container 6 and when the cap T is unscrewed, the energy is released and the reservoir 1 with the through hole 3 thereof rises towards the inside of the cover 2, thereby stopping the inner circulation of the liquid and ensuring the dose served and, in the event that the container 6 tips over or falls, preventing the loss of the liquid content.

In this preferred embodiment, as seen in FIGS. 1/A to 1/F, the cover 2 contains, proximal to the lower mouth 11 thereof, two longitudinal segments 4 whose lower distal end has hooking rods 4bis to receive rubber rings 22 as compression means; on said cover 2 there are vertical through grooves 16 that act as a guide and stop for the path of the pins 15 of the reservoir 1 such that when the cap T of the container 6 presses the mouth 14 of the reservoir 1, the reservoir descends, the compression means tighten and the pins 15 slide through the grooves 16 and stop when side through hole 3 of the reservoir 1 exits the cover 2 to the filling position; meanwhile the cover 2 remains steady and seated on the container 6 by the perimeter flap 7 of the mouth 13; when the cap T is unscrewed to serve the dose, the compression means 22 is immediately released and the reservoir 1 rises and the side through hole 3 is inserted into the cover 2 at the same time that the perimeter flange 8 of the reservoir 1 comes in firm contact with the lower frustoconical mouth 11 of the cover 2. FIG. 1/B shows the reduced mouth ER. FIG. 1/C shows the reservoir 1 where 14 is its mouth, 15 its pins, 3 indicates the side through hole; 8 indicates the leak-tight closing perimeter flange and 19 indicates a transverse slit located at the base of the reservoir 1 that receives the rubber rings 22. FIG. 1/F shows the correct position of the invention inserted in the container 6 closed with the cap T that presses the reservoir 1 so that it descends and, therefore, when the side through hole 3 exits the cover 2, it acts as a mouth for filling said reservoir 1 by turning or tipping over the container 6.

Figure 2:
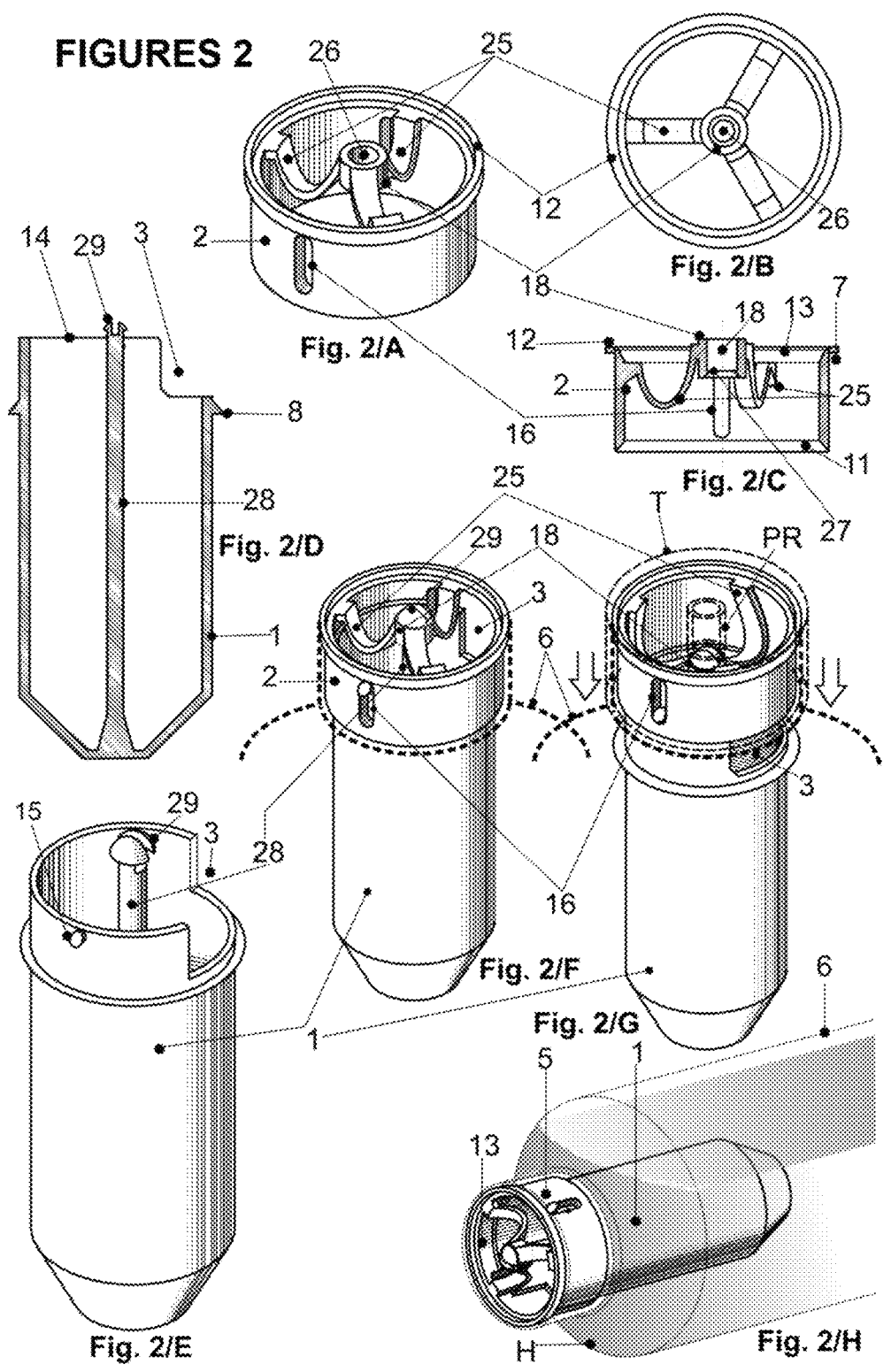
FIG. 2 show in perspective, cross-sectional and plan views a possible embodiment of the dosing cylinder according to the present invention.

In another preferred embodiment, FIGS. 2/A to 2/H show the invention equipped with other compression and assembly means of the elements thereof, but maintaining the basic system, formation and operation. FIGS. 2/A, 2/B and 2/C show the cover 2 that adopts as compression means at least two spokes 25 which converge in a small cylinder 18 with a through hole 26 that receives the anchoring tabs 29 of the shaft 28 that join it to the reservoir 1; the cover 2 and the spokes 25 are made of an elastomeric polymer whose geometry, when altered by pressure and said pressure then ceasing, returns to the previous shape and position thereof. Therefore, said properties are used as compression means. FIG. 2/D is a cross section of the reservoir 1 where 3 indicates its side through hole, 14 identifies its mouth, 29 indicates the anchoring tabs of the concentric axis 28 of the reservoir 1 that are fastened to the cylinder 18. FIGS. 2/E, 2/F and 2/G show the reservoir 1 in a perspective view with the adopted numbering and FIG. 2/H shows the container 6 with a 90° inclination, without spilling a single drop after pouring the dose. FIG. 2/C shows an inner step 27 of the smaller cylinder that retains the tabs 29 of the shaft 28.

Figures 3, 3C, 3E:
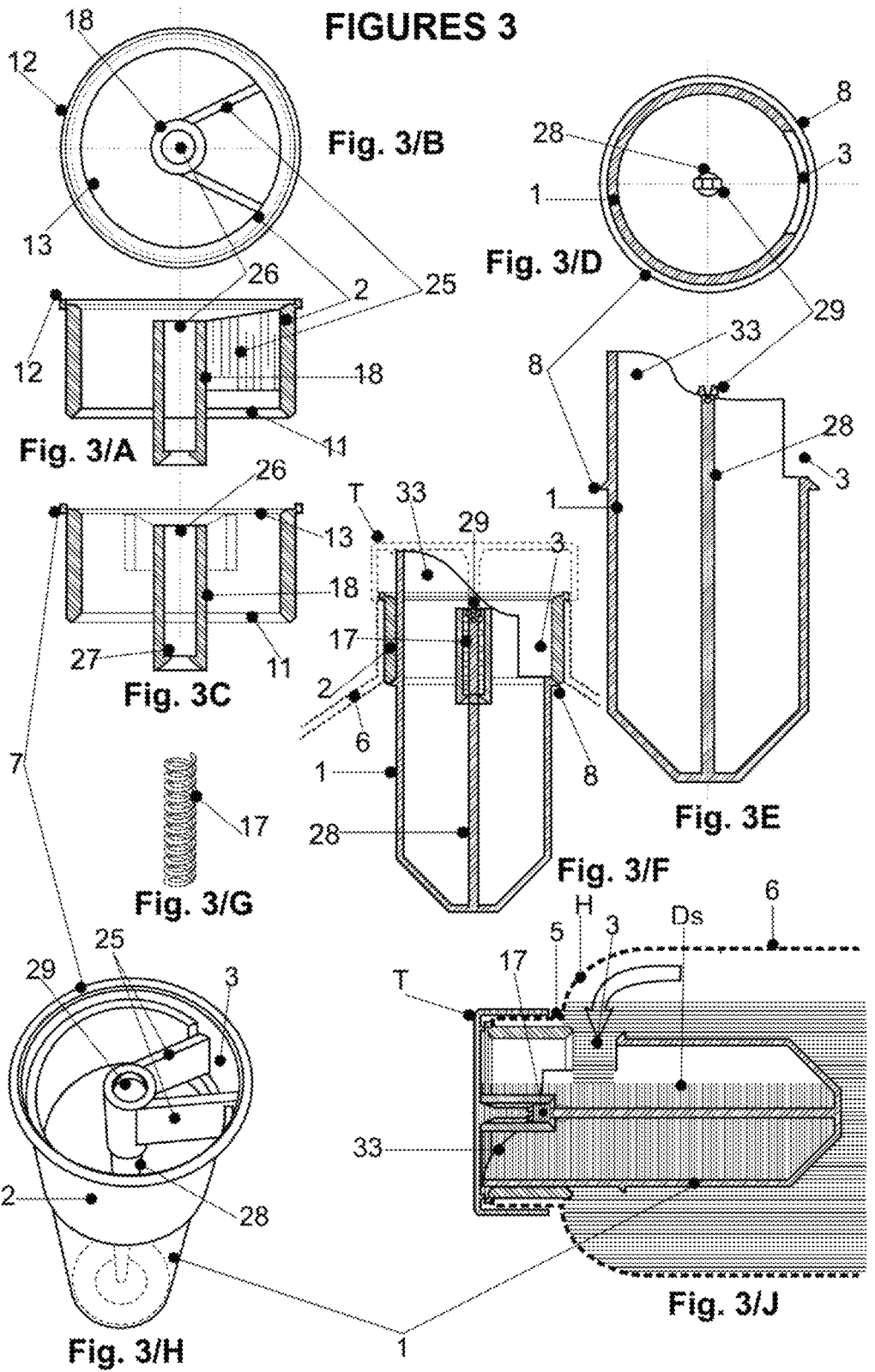
FIG. 3 show in elevation, plan, cross-sectional and perspective views another possible embodiment of the dosing cylinder according to the present invention.

In another preferred embodiment shown by FIGS. 3/A to 3/H, the smaller cylinder 18 of the cover 2 receives the tabs 29 as an anchoring means between both pieces and the spring 17 as compression means; FIGS. 3/D, 3/E, 3/F and 3/H show the reservoir 1 containing the central shaft 28 and a half-round extension 33 at the mouth 14 to facilitate pouring; FIG. 3/J highlights the selection and filling position of the reservoir 1 whose side through hole 3 enters the container 6 to fill the reservoir 1 in a lowered position due to a central extension PR that contains the cap T. The spring 17 is compressed by the central extension PR. All figures have the adopted numbering.

Figure 4:
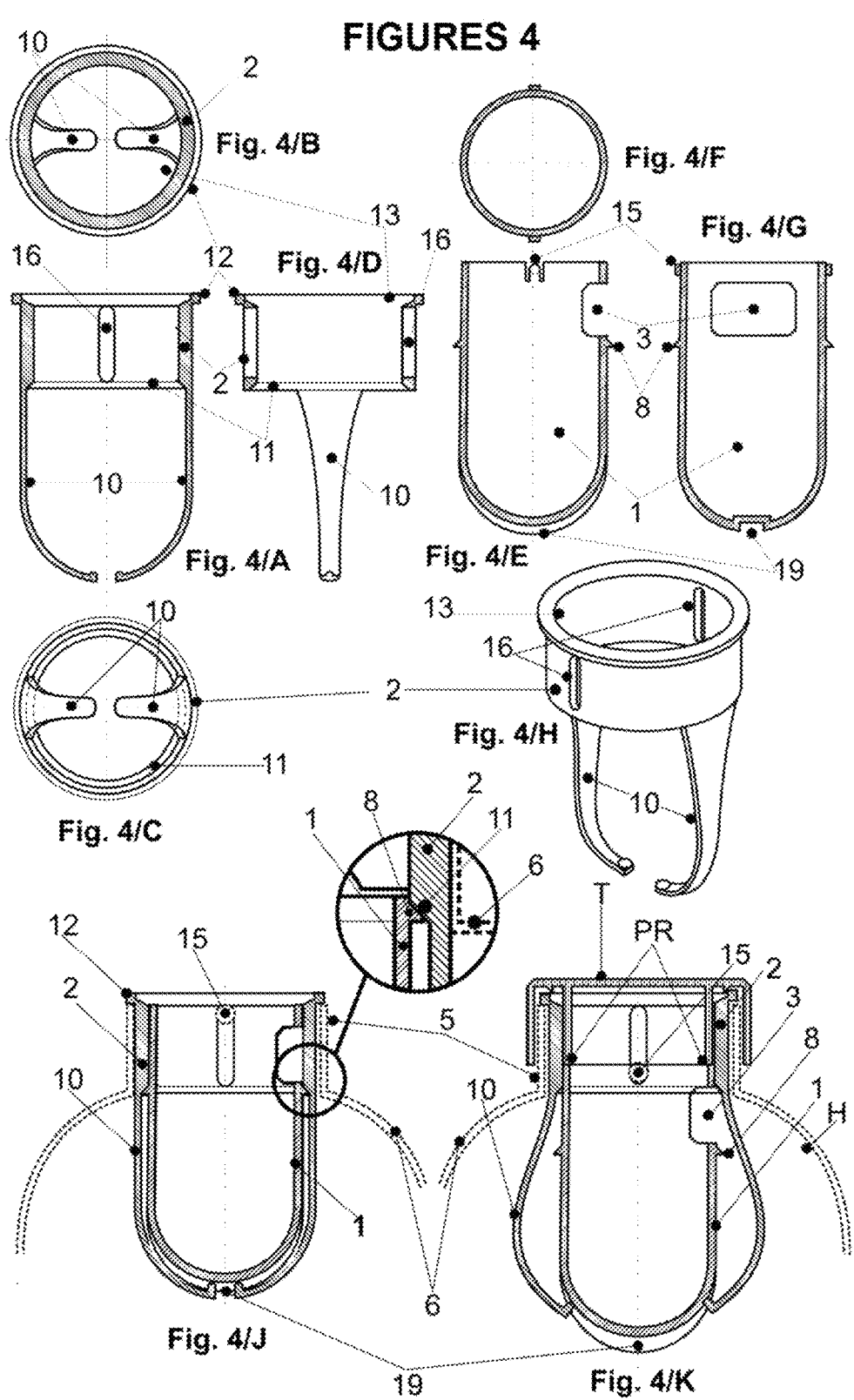
FIG. 4 show in elevation, plan, cross-sectional and perspective views a possible embodiment of the dosing cylinder according to the present invention.

In another preferred embodiment, shown in FIGS. 4/A to 4/K, the cover 2 is made of an elastomeric polymer and the compression means are exerted by at least two segments 10 that clasp the reservoir 1 and adapt to the morphology thereof; when the cap T lowers the reservoir 1, the leaf springs 10 open, as can be seen in FIG. 4/K, forced by the semi-spherical base of said reservoir 1 that contains a groove 19 which guides the lower distal ends of said leaf springs 10 and when the pressure of the extension PR of the cap ceases, the reservoir 1 rises, as shown in FIG. 4/J which shows the closure of both elements.

Figure 5:
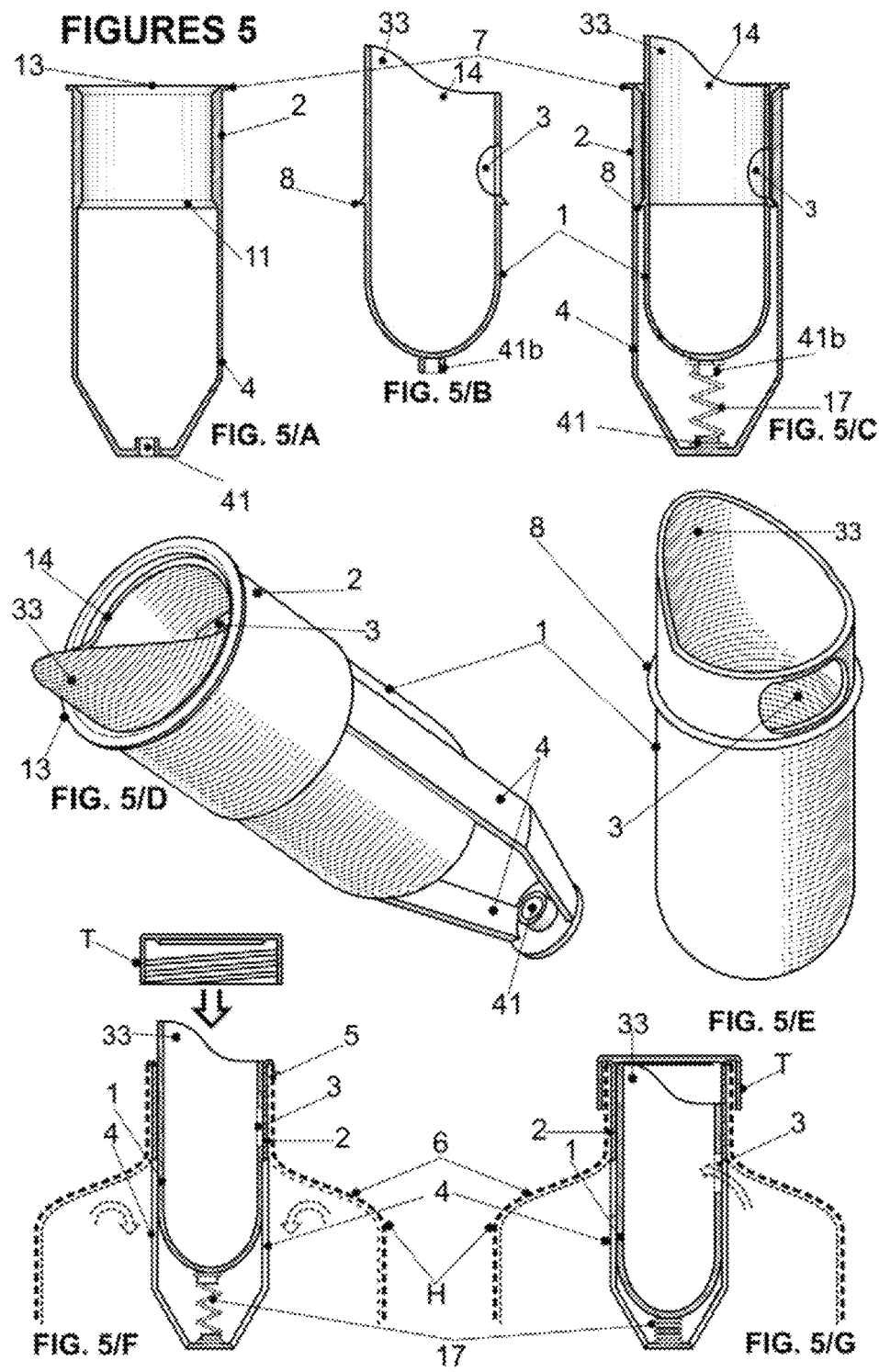
FIG. 5 show in elevation, cross-sectional and perspective views a possible embodiment of the dosing cylinder according to the present invention.

In a preferred embodiment shown by FIGS. 5/A to 5/G of the lower mouth 11 of the cover 2, longitudinal segments 4 emerge which join the lower distal ends 4 thereof as a bracket to hold the pin 41 that serves as a seat for a compression spring 17. The reservoir 1 contains a half-round extension 33 at the mouth 14 thereof to facilitate pouring and to advance the pressure point that causes the reservoir to descend by means of the screwing of a cap T, in this case a common cap. All figures contain the adopted numbering. FIG. 5/C shows a pin 41b, which in this preferred embodiment is located at the base of the cylinder and which is used to receive one end of the spring 17.

Figure 6:
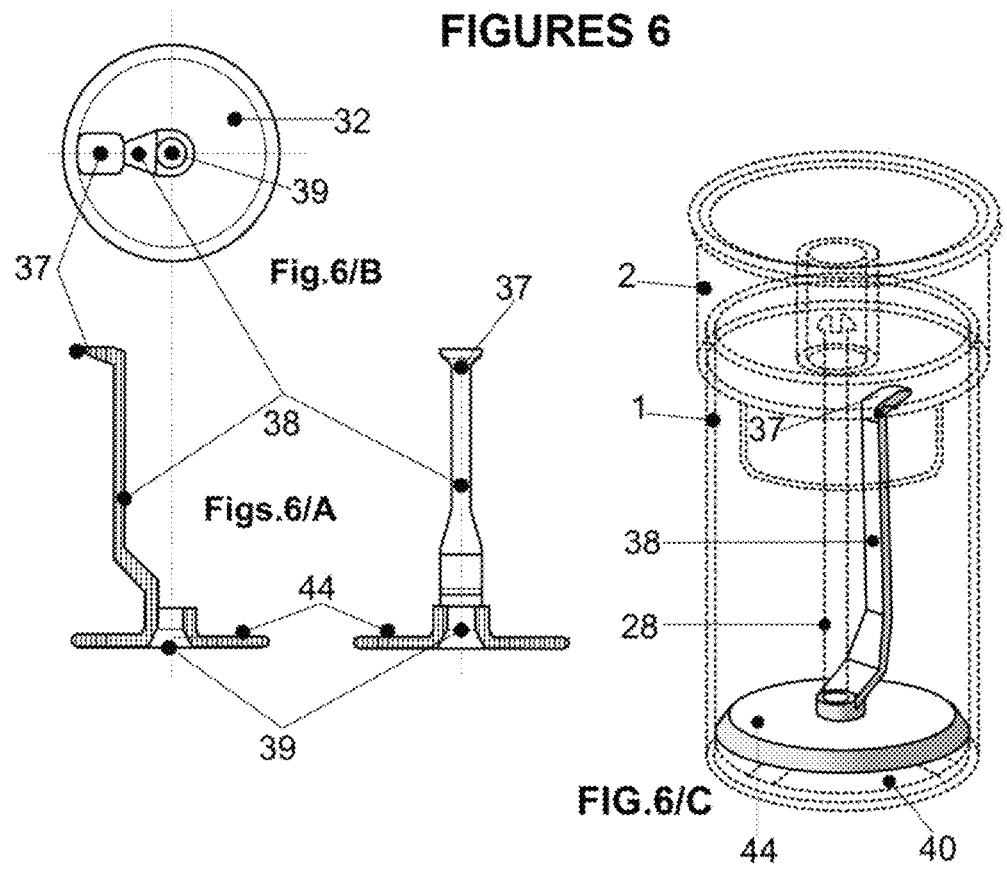
FIG. 6 show in elevation, plan, cross-sectional and perspective views a possible embodiment of the dosing cylinder containing a device that changes the doses according to the present invention.
Figure 6:
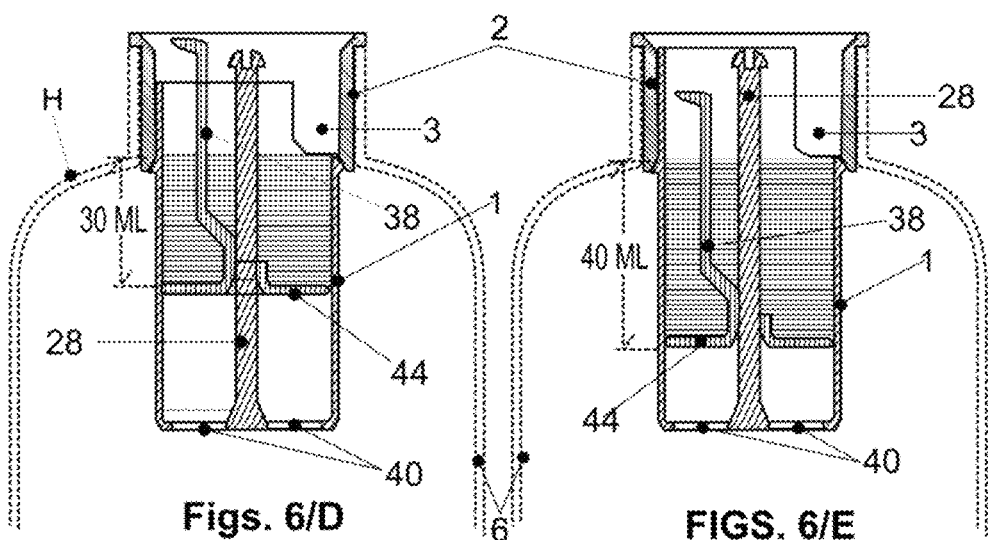

In another preferred embodiment shown in FIGS. 6/A to 6/E, a device is shown that is located on the shaft 28 of the reservoir 1 by means of the clamp 39 associated with a plunger 44 that is actuated with the control 37 of the segment 38 which, when raising or lowering said plunger 44, changes the doses Ds, thus establishing the dose needed. FIGS. 6/D and 6/E show two positions of the plunger (44) that make up different doses. FIGS. 6/C, 8/D and 6/E have a base 40 of the reservoir which in this embodiment is perforated so that the plunger 44 can be lowered without difficulty inside this distinct reservoir.

Figures 7, 7D:
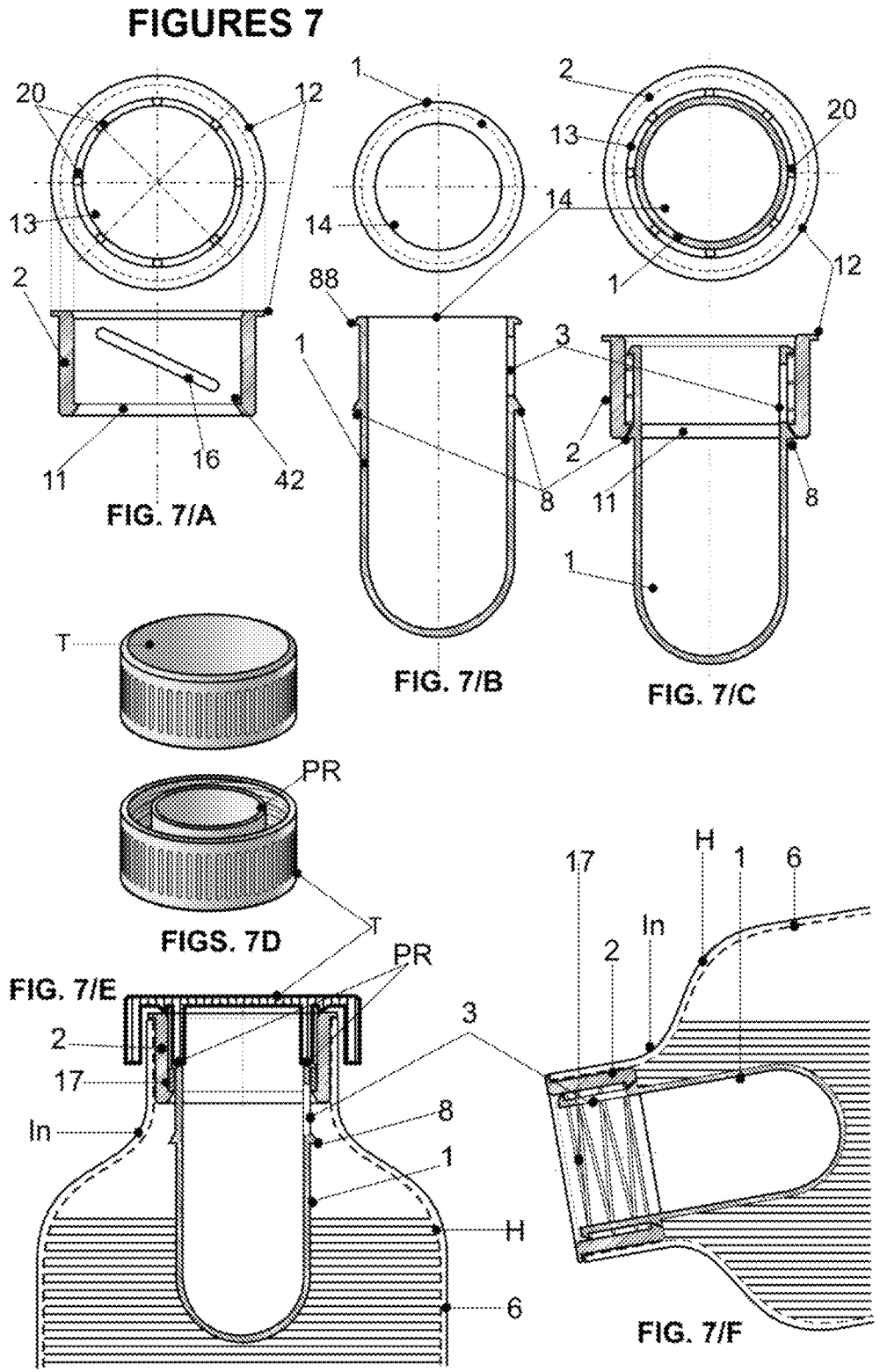
FIG. 7 present in elevation and perspective views a possible embodiment of the dosing cylinder with diagonal grooves according to the present invention.

In another preferred embodiment shown by FIGS. 7/A to 7/F in plan and cross-sectional views, an example of the invention is presented which uses a large diameter compression spring 17 located between the inside of the cover 2 and the outside of the reservoir 1. For it to act, said spring 17 has a perimeter stop 42 at the base of the cover 2 and a perimeter stop 88 located in the mouth 14 of the reservoir 1. FIG. 7/A highlights the diagonal groove that causes the reservoir to rotate as it moves in both directions. FIG. 7/A has vertical flanges or slots 20 that reduce friction between the cylinder and the bushing to facilitate the sliding thereof. All figures contain the adopted numbering.

Figure 8:
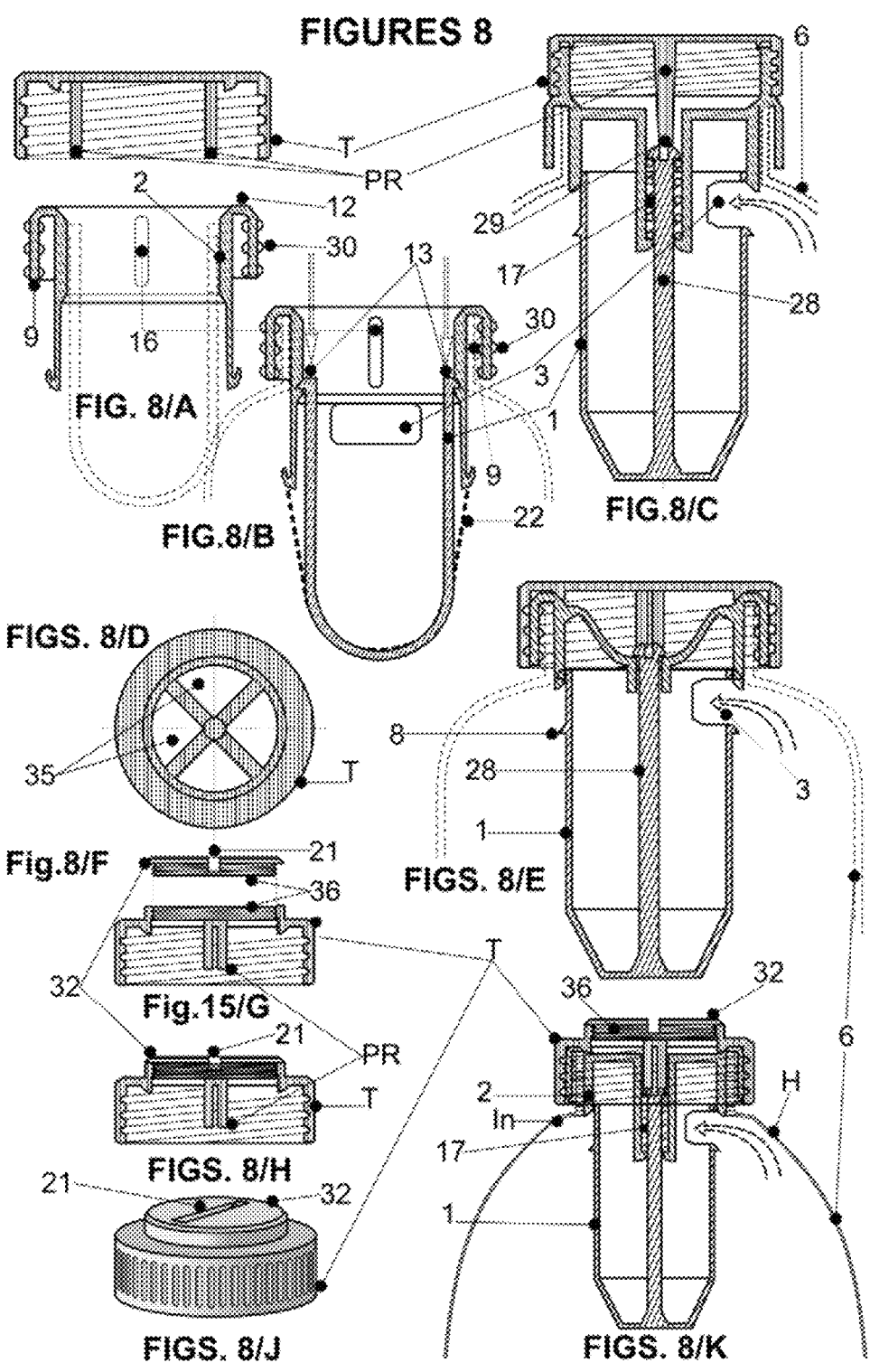
FIG. 8 show in elevation, cross-sectional and perspective views a possible embodiment of the dosing cylinder using a distinct cap according to the present invention.

In a preferred embodiment and in order to extend the insertion means of the reservoir 1 and the cover 2 to the container 6, FIGS. 8/A to 8/B and 8/E show respective covers 2 in various preferred embodiments which contain a larger peripheral and concentric enlargement 30 with a two-sided thread, the inner thread 9 being screwed on the container 6 and the outer thread receiving the cap T; FIG. 8/C shows a variant of the cover 2 which, due to the upper extension thereof, allows the original cap of the container to be used. FIGS. 8/D, 8/F, 8/H, 8/J and 8/K show in plan and perspective views the development of a special cap T designed to cover all needs when using liquid products that can be dosed, as it may be necessary to serve larger amounts of liquid and the system is configured to strictly serve one dose at a time. For this reason, said special cap T has a concentric through hole 35 with thread 36 and lid 32 all located thereon; said lid 32 is unscrewed by means of the slot 21 with a coin and since the cap T is screwed on and maintains its function of opening the through hole 3 of the reservoir 1, part or all of the contents of the container 6 can be poured through said through hole 35 which closes said lid 32 of the cap T. FIG. 8/F indicates the upper slot 21 of the lid 32 of the cap T, which is used to unscrew it with a coin.

Figure 9:
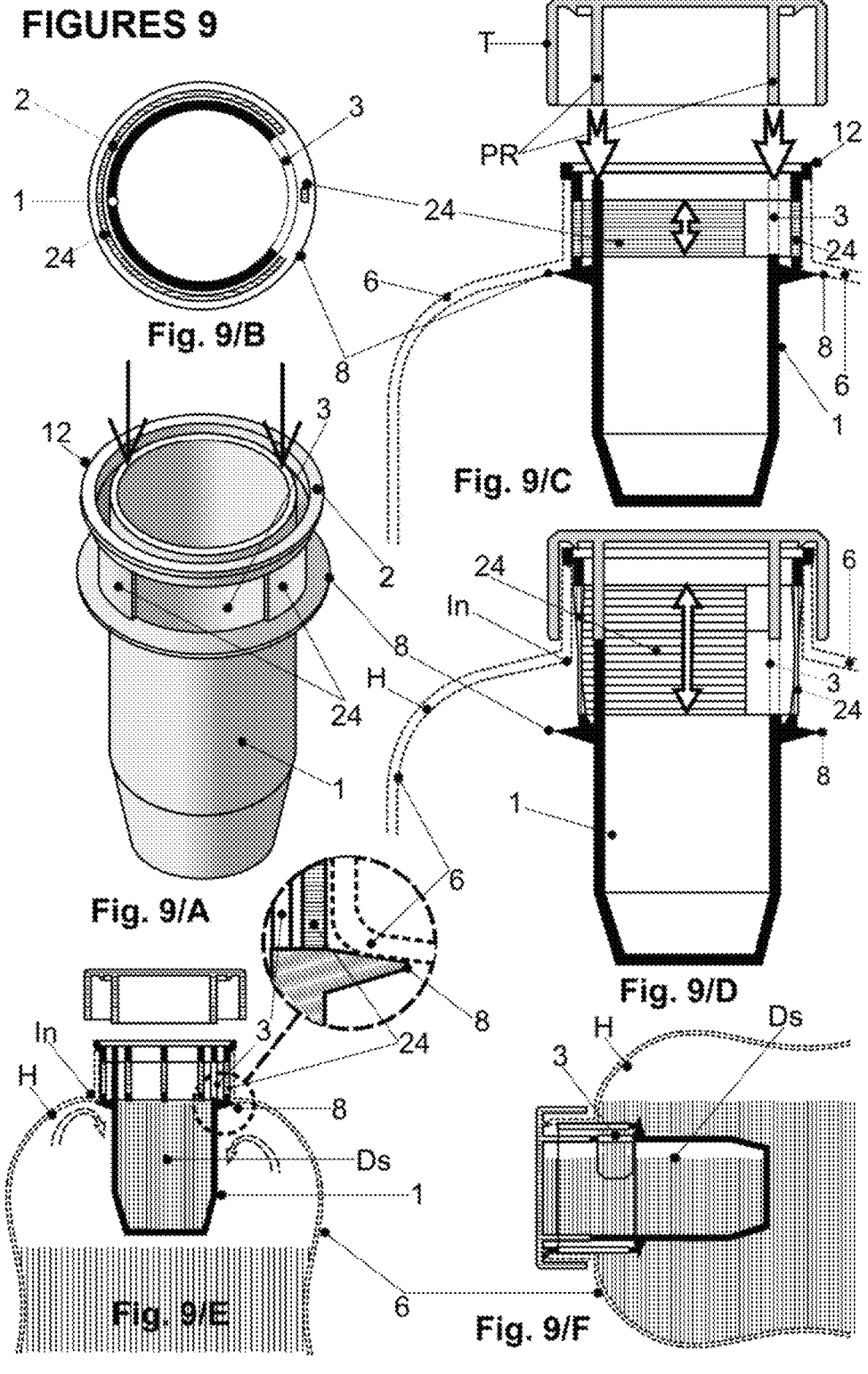
FIG. 9 present in elevation, cross-sectional and perspective views another possible embodiment of the dosing cylinder made in one piece according to the present invention.

In another preferred embodiment shown by FIGS. 9/A to 9/F, the object of the invention manufactured in one piece is described. FIGS. 9/A and 9/B show in perspective and plan views the structure that makes such simplification possible. It is important to remember that the very structure of the container and more specifically the perimeter intersection that forms the base of the neck 5 of the container 6 with the start of the shoulder H of said container 6 is used by this invention as an advantageous part of the system; however, for this system to function the elements thereof must be made from two types of materials. One rigid material and the other material with elastic qualities; therefore, in this preferred embodiment the means are not compression means like above but rather traction means. Let's see why: The cylindrical cover 2 is made with a low height and rigid material, and the reservoir 1 is made with a rigid material, except for the perimeter flange 8 thereof which must be made with an elastic material. The joining link between both elements is created by a semi-perimeter mesh or curtain or vertical segments of elastic material 24 which joins the lower mouth 11 of the cover 2 with the perimeter flange 8; said flange 8 is oversized so that when inserted into the neck 5 of the container 6, it passes through the intersection In of the neck 5 and shoulder H of the container 6 with some difficulty and it remains sufficiently tight to close the passage of the liquid until the cylindrical extension PR of the cap T, when screwed on, presses the upper edge of the mouth 14 of the reservoir 1 which descends next to the perimeter flange 8 and the through hole 3, which enables the passage of the liquid that fills said reservoir 1 with the dose. Once this is selected, upon removing the cap to serve it, the reservoir 1, the through hole 3 and the perimeter flange 8 rise to close the circulation of the contained liquid and serve the calibrated dose in a completely safe and hygienic manner.

Figure 10:
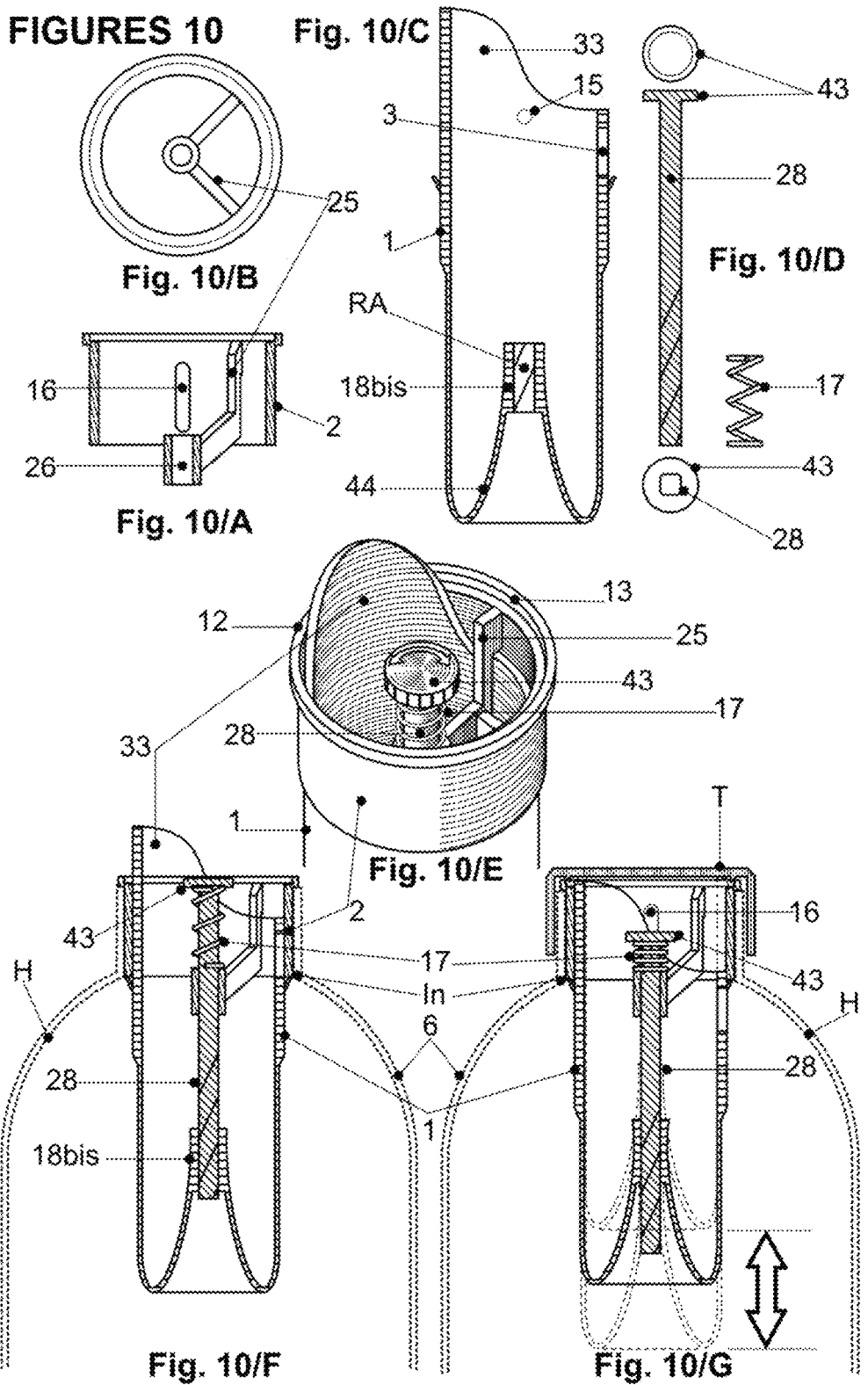
FIG. 10 describe in elevation, cross-sectional and perspective views a possible embodiment of the dosing cylinder with a device for changing the doses according to the present invention.

In another preferred embodiment shown by FIGS. 10/A to 10/G, a device that enables the magnitude of the dose Ds to be changed is presented integrated in the dosing system, object of the invention, and the operation of which is based on a reservoir 1 made of elastic material in two thicknesses. The greater thickness makes up half the length of the cover 2 and the mouth 14; the smaller thickness configures the lower half of the reservoir 1 which at the base thereof contains an inner truncated cone that rises to the vertex thereof equipped with a through hole RA with threading

18_bis_ in order to receive a rotating shaft 28 fastened in the cylinder 26 of the cover 2 with a lower distal end equipped with a worm thread; the upper distal end thereof contains a control disk 43 which, when rotated manually, moves the base of the reservoir 1 in both directions, a rotation that transforms the length and volume thereof and therefore produces a change in the magnitude of the dose. All figures contain the adopted numbering.

Figure 11:
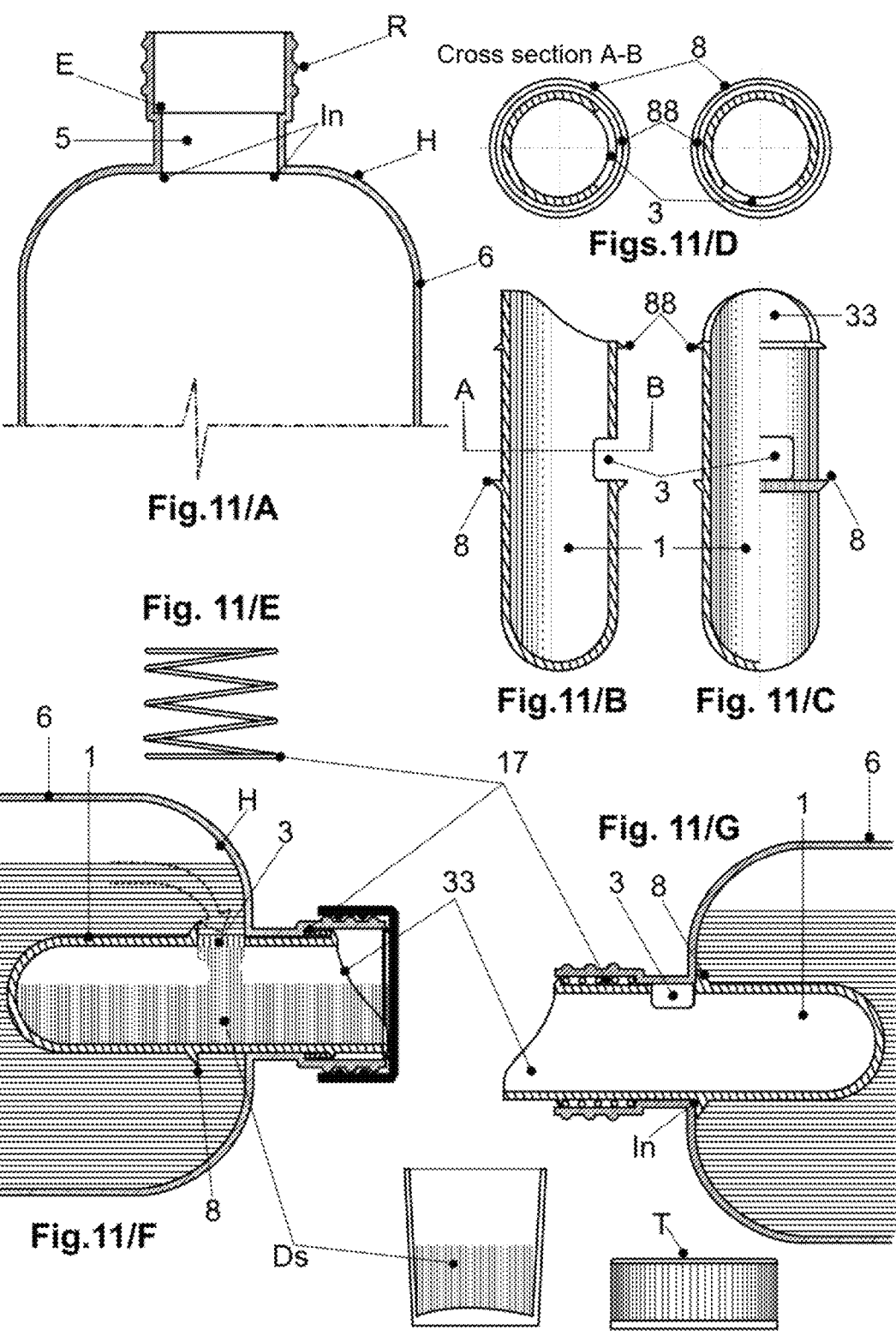
FIG. 11 show in elevation and cross-sectional views and diagrams of use another possible embodiment of the dosing cylinder made in one piece according to the present invention.

In another preferred embodiment shown by FIGS. 11/A to 11/G, the invention is presented in one piece: the reservoir 1, which uses the intersection In between the neck 5 and the shoulder H as insertion or anchoring means and the cylindrical length of the neck 5 as a manoeuvring area; said neck of the container 6 contains a step E as a stop of a spring 17 such that this preferred embodiment does not need the cover 2 to function; the reservoir 1 contains an oversized perimeter flange 8, located under the through hole 3 and at the mouth thereof it has another special perimeter flange 88 that acts as a counter-stop for the compression spring 17. All figures have the adopted numbering.

Figure 12:
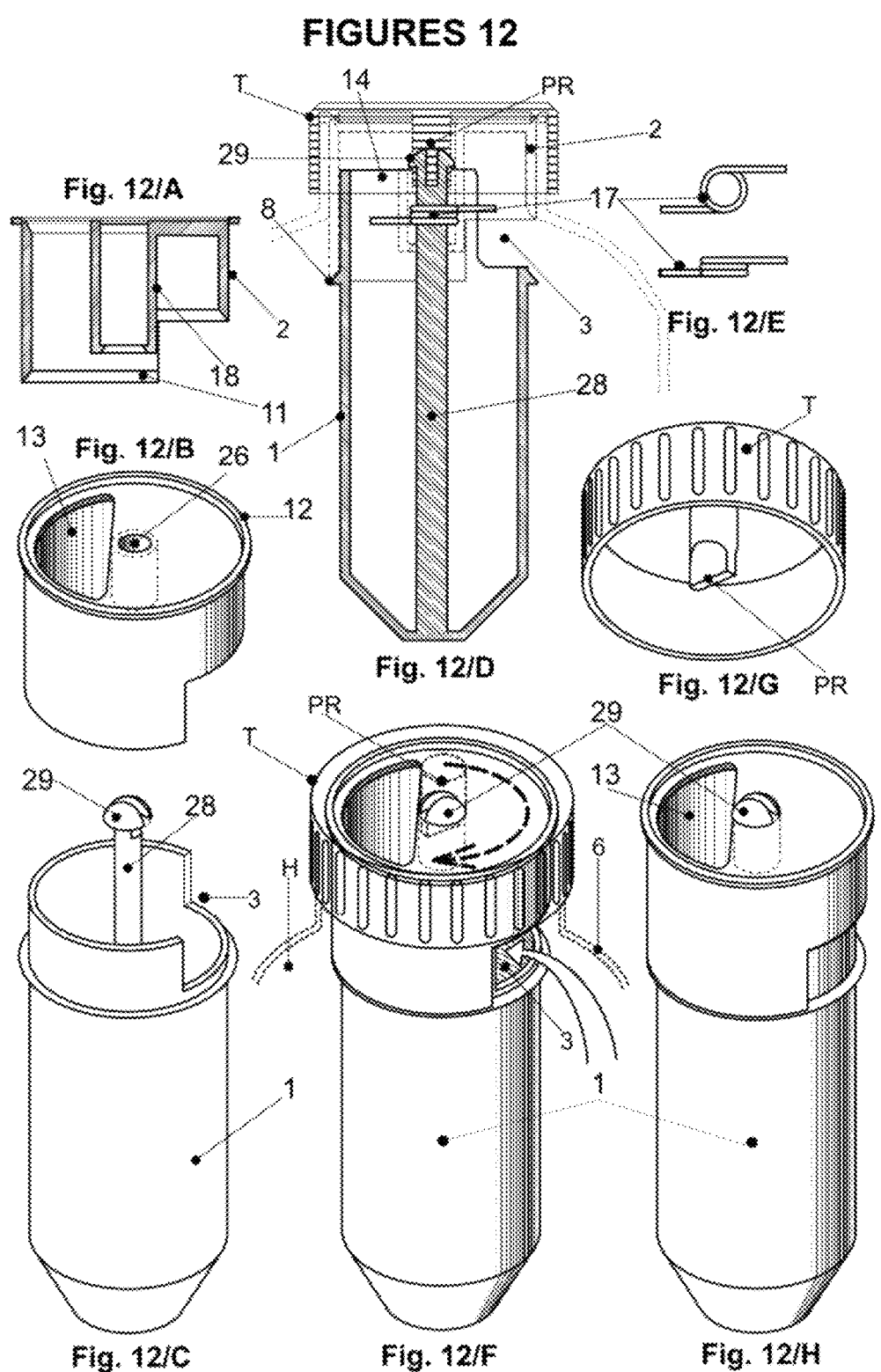
FIG. 12 show in cross-sectional and perspective views a preferred embodiment wherein the cylinder rotates with the final turn of the cap in order to open the side through hole.

In another preferred embodiment shown in FIGS. 12/A to 12/H, when the cap T is screwed on to close the container 6, the central extension PR thereof with a screwdriver head is inserted between the tabs 29 to rotate the reservoir 1 and pull the side through hole 3 out of the elongated cover 2 and proceed to fill it; at that moment, the compression means 17, which in this case is a spring, is activated; FIG. 12/G shows the extension PR as a screwdriver which reaches and turns the tabs 29, in FIG. 12/F, in the last ¾ turn for closing the cap T and keeps the hole 3 open until the cap T is unscrewed, which releases the compression means 17, which drives the through hole 3 into the cover 2, closing the passage of the liquid. All figures contain the adopted numbering.

The invention claimed is:

1. A liquid dispensing dosing device for a liquid receptacle with a dispensing neck that can be closed with a cap, the dosing device comprising:

first coupling means (12) for coupling the dosing device to a neck (5) of a liquid receptacle;

a liquid reservoir (1) comprising a liquid inlet hole (3), the liquid inlet hole (3) being arranged to be inserted into the liquid receptacle when the dosing device is coupled by means of the first coupling means (12);

a cover (2) for the liquid inlet hole (3), the cover (2) and the reservoir (1) being slidably connected;

in which the reservoir (1) comprises a top, a bottom and a side wall that joins the bottom to the top, wherein the top is open to the outside, the side wall comprises the liquid inlet hole (3) and the bottom comprises a wall that extends to the side wall, preventing liquid from entering below the liquid inlet hole (3), the dosing device having:

a first configuration wherein the cover (2) covers the liquid inlet hole (3) of the reservoir (1), preventing liquid from passing through the liquid inlet hole (3), the liquid reservoir (1) comprises a protrusion (8) configured to come in contact in a leak-tight manner with the cover (2) in the first configuration, a second configuration wherein the cover (2) does not cover the liquid inlet hole (3), allowing liquid to enter the liquid reservoir (1) through the liquid inlet hole (3);

second coupling means (29, 88) for coupling to the cap (T) of the liquid receptacle configured to be pressed by the cap (T) in a closure of the dispensing neck (5) so as to cause sliding between the liquid reservoir (1) and cover (2), going from the first configuration to the second configuration;

return means (10, 17, 22, 24, 25) for returning from the second configuration to the first configuration and configured to cause sliding between reservoir (1) and cover (2), going from the second configuration to the first configuration by releasing the pressure exerted by the cap (T) on the second coupling means for coupling to a further cap (29) at the opening of the dispensing neck (5);

characterized in that the return means (10, 17, 22, 24, 25) are adopted on the cover (2) as part of the cover (2).

2. The dosing device according to claim 1, characterized in that the cover (2) adopts as return means at least two spokes (25) which converge in a small cylinder (18), the cover (2) and the spokes (25) being made of an elastomeric polymer whose geometry, when altered by pressure and said pressure then ceasing, returns to the previous shape and position thereof.

3. The dosing device according to claim 2, characterized in that the small cylinder (18) is provided with a through hole (26) that receives anchoring tabs (29) of a shaft (28)

that join it to the reservoir (1), the reservoir (1) being fastened to an inner shaft (28) of the reservoir and wherein the shaft (28) is joined to the cover (2) by the return means in the form of said spokes (25).

4. The dosing device according to any one of the preceding claims, wherein the cover (2) comprises a face oriented towards the hole (3) of the reservoir and wherein said face has a protrusion configured to come in contact in a leak-tight manner with the reservoir (1) in the first configuration.

5. The dosing device according to claim 1, wherein the first coupling means (12) for coupling to a neck (5) comprise a bushing wherein the cover (2) is part of the bushing with a perimeter protrusion (12).

6. The dosing device according to claim 5, wherein the cover (2) comprises a channel (16) or a protrusion and the reservoir (1) comprises, respectively, a protrusion (15) complementary to the channel (16) of the cover or a channel complementary to the protrusion of the cover (2).

\* \* \* \* \*